May 24, 1960  N. D. FULTON  2,937,830
EJECTING DEVICE FOR AIRCRAFT
Filed July 30, 1956  2 Sheets-Sheet 1

INVENTOR
NATHANIEL D. FULTON

BY
HIS AGENT

May 24, 1960 N. D. FULTON 2,937,830
EJECTING DEVICE FOR AIRCRAFT
Filed July 30, 1956 2 Sheets-Sheet 2

INVENTOR
NATHANIEL D. FULTON
BY *William R. Wright, Jr.*
HIS AGENT

United States Patent Office 2,937,830
Patented May 24, 1960

2,937,830

EJECTING DEVICE FOR AIRCRAFT

Nathaniel D. Fulton, Bernardsville, N.J., assignor, by mesne assignments, to Thiokol Chemical Corporation, a corporation of Delaware Filed July 30, 1956, Ser. No. 600,919

1 Claim. (Cl. 244—122)

This invention relates generally to ejection devices and more particularly to a device for ejecting a pilot and his seat from high-speed aircraft while in flight.

Over the last dozen years, military aircraft speeds have steadily mounted to the supersonic range. Because of the extreme aerodynamic and maneuver forces which accompany these velocity conditions, even in the subsonic range, it has been necessary to develop various types of devices for the ejection of aircraft personnel under emergency conditions. These operate essentially against the inertia load of the pilot and seat at aircraft speeds in the subsonic range and project the load beyond any aircraft obstructions—and particularly the empennage—upon which the pilot releases his parachute.

The use of a rocket powered ejecting device is disclosed by the patent to Kleinhans, No. 2,552,181, dated May 8, 1951. However, the propulsive efficiency of a conventional rocket is very low until motion commences and the attendant high fuel consumption is extremely disadvantageous for the purpose in question. Another major objection to an unconfined rocket system is the likelihood of fire or explosion which is undesirable even though the aircraft is being abandoned, particularly in a multi-crew aircraft.

The present invention is an improvement on aircraft ejection systems including the invention disclosed in the pending application of Nathaniel D. Fulton, Serial No. 524,411, filed July 26, 1955, which discloses an improved ejection device which obviates the above and other disadvantageous characteristics of known ejecting devices. This is accomplished through the use of an initially enclosed rocket system which efficiently provides the high initial acceleration required of ejecting devices and then provides sustained thrust which is necessary in order to attain the end velocity needed to clear aircraft obstructions or to impart the additional trajectory altitude which will insure parachute deployment in the event of low altitude escape.

However, while the above-referred invention provides a highly successful and satisfactory solution of the prior problems mentioned, it has since been found desirable to accurately control the effect or performance of the solid propellant charge of the rocket motor over the wide range of ambient temperatures through which it must be operated. This same temperature control is equally desirable in the case of other ejection catapult types.

To effect successful ejection, the propellant charge must impart a certain velocity and this requires an acceleration in the order of 10 to 20 g's. Moreover, the propellant grain must be designed to give the required acceleration over ambient temperatures ranging from —65 F. to +160 F. This is very difficult as the rate of burning of the propellent varies considerably with the temperature. As a result, if the grain is designed to give the necessary and velocity at low temperatures, the accelerations at high temperatures when the grain burns faster, may be excessive.

If temperature insensitive propellents were known and had the other required characteristics, there would, of course, be no problem. Further, the temperature conditioning of a propellent by means of some type of a heater on cold days or a refrigerator on hot days, is ordinarily complex and unreliable.

Accordingly, the chief object of the present invention is to provide means for ensuring a uniform performance or effect of the propellant grain of the ejection device over the indicated ambient temperature range during the ejection of the pilot and his seat or other appurtenance from the aircraft.

An important object of the present invention is to provide means in an initially enclosed ejection system of the type described which ensures the proper pressure for ejection at low temperatures and dispose of excess pressures at high temperatures without subjecting the aircraft to fire hazards.

A further important object of the present invention is to provide an improved, initially enclosed ejection system which enables the use of lighter catapult tubes and the relief of excess pressures due to high temperatures.

A still further important object of the present invention is to provide an initially enclosed ejection system of the type described having a pressure relief valve at the base of the fixed catapult tube and vent means connecting the valve with the exterior of the aircraft.

Another object of the present invention is to provide the foregoing advantages with an initially enclosed rocket ejection system of the type described.

Other objects and advantages of the present invention will become apparent during the course of the following description.

In its broadest aspects, the invention contemplates the use of an initially enclosed ejection system incorporating pressure relief means whereby excessive pressures generated by the propellant grain or other gas forming mixtures may be automatically vented to the exterior of the aircraft.

In the drawings I have shown two embodiments of the invention. In these showings:

Figure 1:
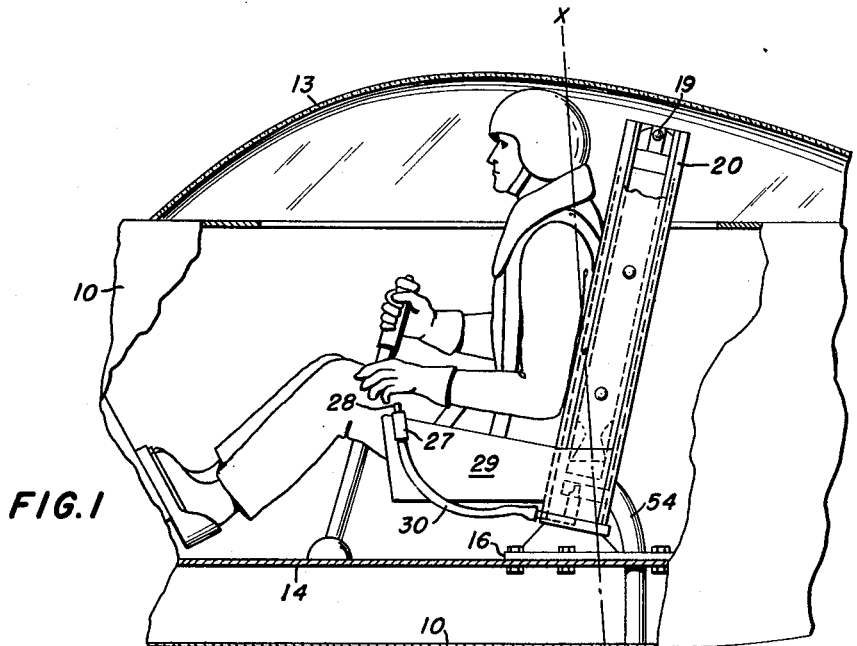
Figure 1 is a side elevational view partly in section of the invention in operative position in the fuselage of an aircraft.

By way of illustration, the ejecting devices disclosed herein are arranged to eject the pilot's seat from the aircraft. However, it will be appreciated that detachable appurtenances other than the pilot's seat may also be ejected. For example, cargo and survival items, armament and ammunition, and important military items not for enemy inspection which may or may not be subject to automatic destruction after ejection, comprise such items and it will be appreciated that after ejection, suitable means can be employed to again enclose vacated spaces.

Referring to the drawings, numeral 10 indicates the fuselage of an aircraft having a pilot's cockpit including a canopy 13 and a floor 14. A rearwardly inclined catapult tube 15 is fixed midway between the sides of the fuselage 10 to the floor 14 by means of a bracket 16.

An inner catapult tube 17 comprising the rocket motor to be described, fits slidably within the fixed tube 15 and includes an O-ring seal 18 against the escape of propulsive gases between the tubes. The inner tube 17 is pivotally connected at its upper end at 19 by means of a bracket to the center of the hollow back 20 of the seat 23.

Figures 2, 3:
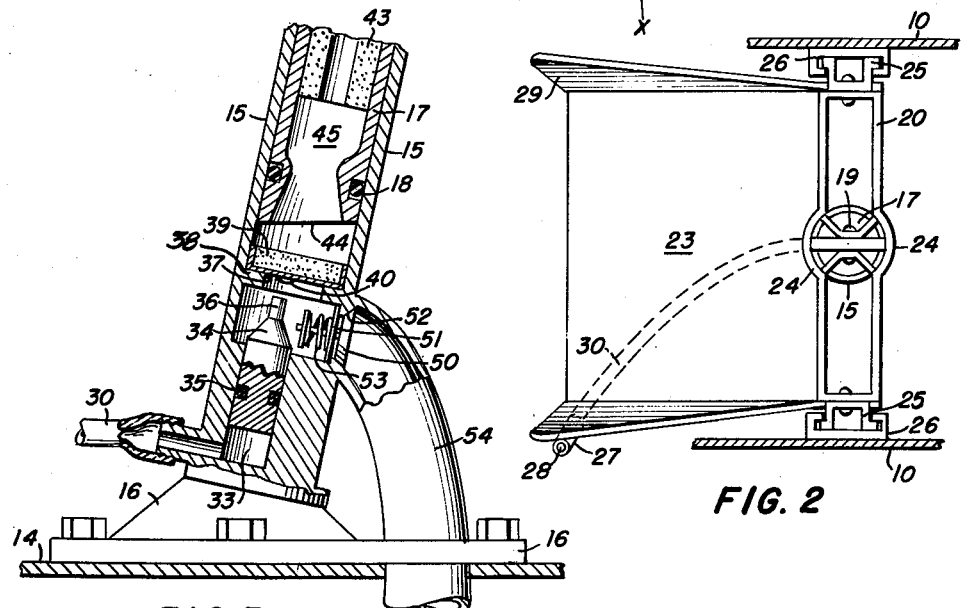
Figure 2 is a top plan view thereof.
Figure 3 is an enlarged, fragmentary, central vertical sectional view of the rocket ejecting means, parts being shown in elevation.

The seat 23 is guided in its upward sliding movement within the cockpit by the hollow back 20 (Figure 2) which, at its central portion is provided with vertically elongated, opposed arcuate portions 24 which closely engage the outer surface of the fixed catapult tube 15. Rotation of the seat 23 about the tube 15 is prevented by flanges 25 fixed to the lateral edges of the back 20 and adapted to cooperate with guide channels 26 fixed parallel with the fixed tube 15 to the inner sides of the fuselage 10.

An initiator comprising a source of high pressure gas 27 having a control 28 is mounted on the sides 29 of the seat 23 and is connected by a tube 30 to a chamber 33 in the base of the catapult tube 15. A piston 34 including an O-ring seal 35 is mounted in the chamber 33 and terminates in a firing pin 36 in alignment with an aperture 37 formed in a partition 38 in the tube 15.

A rocket ignitor 39, which is usually black powder in a waterproof container, is positioned on the partition 38 and, when a percussion cap 40 mounted over the aperture 37 is detonated by the firing pin 36, the ignitor 39 furnishes the necessary pressure and temperature required to ignite the main sustaining charge 43 in the inner catapult tube 17, the lower end of which terminates in a downwardly and rearwardly inclined jet nozzle 44, the axis of which is indicated by the line $x$—$x$. This is shown to be a solid charge, although a liquid propellant may be used, and it supplies the high pressure gases required to drive the pilot and seat out of the aircraft and clear of obstructions.

Figure 7:
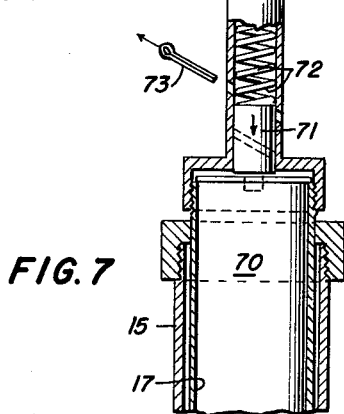
Figure 7 is a fragmentary, vertical, sectional view of the invention as applied to a cartridge type ejection device.

It is to be noted that because the gases are confined within the fixed outer tube 15 and the sliding inner tube 17, there is no fire hazard. Moreover, the thrust generation is substantially immediate and until the sliding inner tube 17 clears the upper end of the outer tube 15, the action of this invention is almost identical with conventional catapults, one of which is shown in Figure 7.

To ensure an even more uniform performance, the present invention provides a pressure relief valve 50 mounted by a spider 51 in the base of the catapult tube 15 so as to close a port 52 under the action of a spring 53. A vent tube 54 connects the port 52 with the exterior of the fuselage 10 to prevent the discharge of hot gases within the aircraft. It will be appreciated that the valve 50 is loaded by the spring 53 so as to remain closed unless the tube pressure exceeds the design value.

The valve operating point is critical only within the following limits. There is roughly a 7 $g$ spread between accelerations high enough to give minimum end velocity and low enough to prevent pilot injury and this corresponds approximately 300–400 p.s.i. allowable pressure variation. Thus, the valve actuation time must be in the order of 20–30 milli-seconds.

This is feasible inasmuch as when a pressure build-up over the design value occurs, the excess pressure has the choice of increasing the acceleration of the 350 pound seat and occupant, or of accelerating the lightweight valve 50. The latter will open, of course, despite a somewhat smaller working area than that of the inner tube 17. The propellent charge is, of course, designed to provide proper pressure at low temperatures as the valve 50 will dispose of excess pressures at higher temperatures.

The operation of the ejecting means comprising the present invention is believed to be readily apparent. In an emergency and after having made the decision to abandon the aircraft, the pilot removes the canopy 13 by conventional means provided for the purpose. He then assumes a prescribed ejection position by placing his feet on seat mounted supports (not shown) and grasps hand grips of which the initiator 27 may be an integral part.

The pilot now presses the control 28 to actuate the initiator and feed high pressure gas through the tube 30 to the chamber 33 which actuates the firing pin 36 to detonate the percussion cap 40 in the ignitor 39. The main charge 43 is thus ignited and the high pressure gases drive the pilot and seat out of the aircraft and clear of obstructions. If the ambient temperature is high, any excessive gas pressure which might result in injury to the pilot through excessive initial acceleration of the seat, is automatically vented to the atmosphere through the vent tube 54 to thus ensure proper ejection.

It is to be noted that, as distinguished from conventional ejection devices, once separation of the tubes 15 and 17 occurs, the thrust of the gases does not cease. It is the continuing thrust of the rocket which makes possible the escape at extremely low altitude by propelling the plot and seat to an altitude which will permit a safe descent by parachute.

It will now be readily apparent that the improved ejecting device comprising the present invention enables the immediate ejection of the pilot and seat upon initiation thereof without subjecting them to excessive and injurious initial acceleration or the aircraft to fire hazards, the ejection force, of course, being continued upon separation of the two catapult tubes by the rocket motor until a safe altitude is reached. Moreover, the pressure relief valve and vent tube do not represent added weight to be carried since they permit the use of lighter catapult tubes which are presently built heavy enough to withstand "lock shut" pressures.

Figure 4:
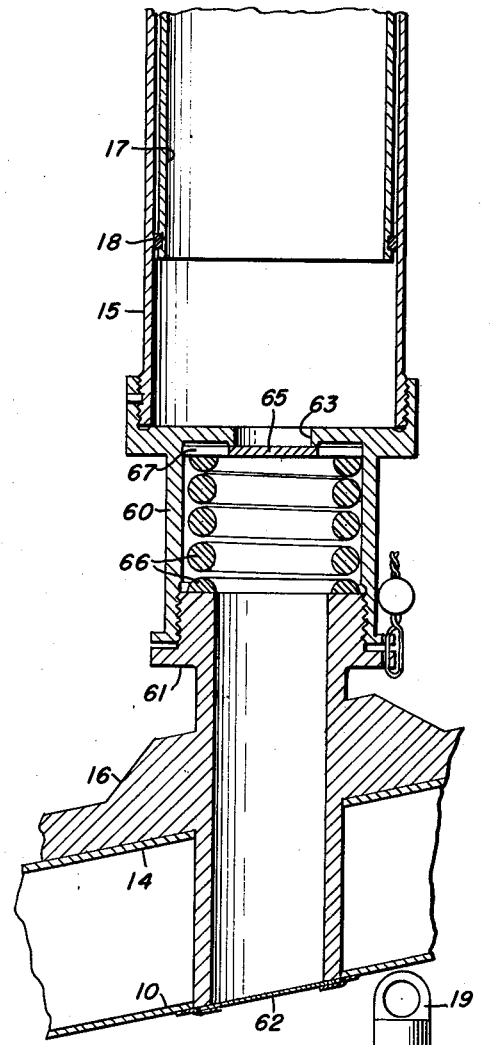
Figure 4 is a further enlarged, fragmentary, central, vertical, sectional view of another embodiment of the invention with the pressure relief valve in closed position.
Figure 5:
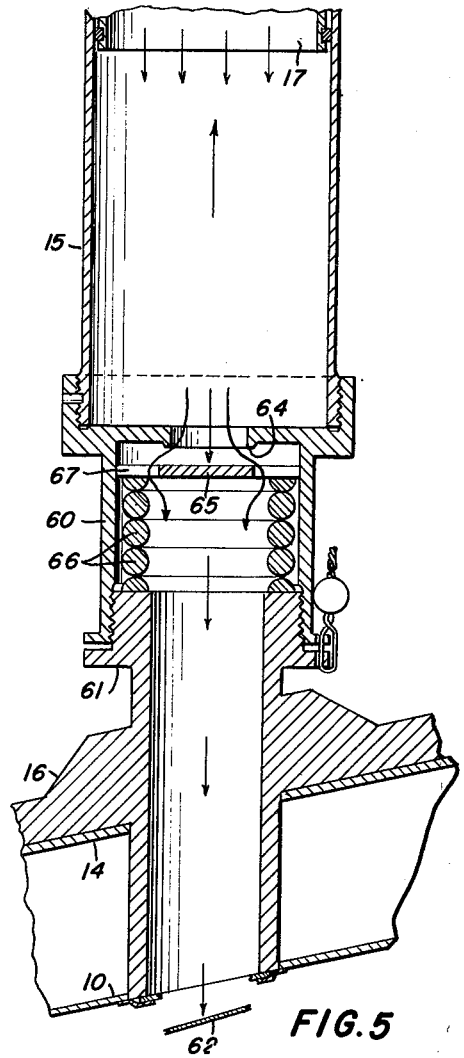
Figure 5 is a view similar to Figure 4 showing the valve in open position to vent excessive pressures to the atmosphere.
Figure 6:
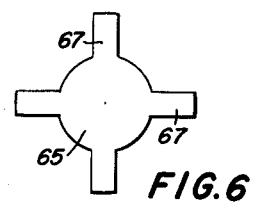
Figure 6 is a plan view of the relief valve plate comprising a part of the invention.

In Figures 4, 5 and 6, I have shown a modified form of the pressure relief valve and vent tube which is particularly suitable for use with a rocket motor wherein the propellant grain is adapted to be electrically ignited under the control of a microswitch mounted adjacent the pilot's seat, or any type of gas pressure actuated ejecting device.

As shown in Figure 4, the fixed tube 15 is screw threadedly connected to the valve body 60 which is similarly connected to a vent tube 61 which extends through and is fixed to the floor bracket 16 and terminates flush with the aircraft fuselage 10. As in the case of the embodiment shown in Figure 1, the open lower end of the vent tube is closed by a burst disc 62 which may be held in place by suitable means such as an annular adhesive strip, etc. to thus eliminate drag which would otherwise be caused by the opening of the tube in the skin of the aircraft fuselage 10.

The valve body 60 is provided with a centrally positioned orifice 63 formed with an annular lip on its lower edge to act as a seat 64 for a flat valve disk 65 (Figure 6) which is urged thereagainst by a compression spring 66 which acts between and against the upper end of the vent tube 61 and the valve wings 67.

The spring 66, of course, maintains the valve disc tightly against its seat 64 unless the pressure of the gases in the fixed ejecting tube exceeds the design valve of the spring. At such time (Figure 5), the valve plate 65 is forced downwardly by the pressure of the gases which then pass around the edges of the plate 65 between the wings 67 and out of the vent tube 61, the burst disc 62 giving way under the pressure.

As shown in Figure 7, the invention broadly and particularly the form of the invention just disclosed, is adaptable for use with any type of gas-pressure actuated ejecting device using a fixed, closed tube such as 15. As previously described, a single inner catapult tube 17 which is pivotally connected at its upper end as at 19 to the pilot's seat, etc. is mounted in the fixed outer tube 15 and may be provided with a cartridge type propellant charge 70. This is adapted to be actuated or fired by a firing pin 71 which is propelled against the igniter cap of the cartridge 70 by a spring 72 when a cotter pin 73 which holds the pin 71 in cocked position, is withdrawn by means of a control cable, etc. (not shown).

The bottom end of the tube 17 being open, the gases generated by the cartridge 70 act against the bottom of the fixed tube 15 to eject the inner tube 17 and the pilot's seat 23, etc. from the aircraft 10. If the pressure of the gases exceeds the design valve of the spring 66, the plate valve 65 opens to vent them to atmosphere until no longer excessive.

It is to be understood that the forms of the invention herewith shown and described are to be taken as preferred examples of the same and that various changes in the shape, size and arrangement of parts may be resorted to without departing from the spirit of the invention or the scope of the subjoined claim.

I claim:

In a device for ejecting a detachable appurtenance from a vehicle comprising in combination, a catapult tube having one closed end fixed to the vehicle, said closed end including a transverse reactive surface for high pressure gases released in said tube, an appurtenance arranged in said vehicle, and a rocket including a convergent-divergent exhaust nozzle mounted in the open end of said tube and connected to said appurtenance to eject it from the vehicle when the rocket is fired, said exhaust nozzle being closely spaced from said reactive surface of said closed end so that the exhaust gases of the rocket when fired act against said reactive surface of the tube to provide a high initial acceleration of the rocket and appurtenance therefrom, and continue to exert thrust when the rocket has cleared the open end of the tube; the improvement comprising means mounted in the catapult tube adjacent the reactive surface for controlling excessive pressure of the gases acting thereagainst, said controlling means comprising a port formed in the catapult tube adjacent the transverse reactive surface, a pressure relief valve mounted in said port subject to the pressure of the exhaust gases and operable to maintain not more than a predetermined pressure variation of the gases acting against the transverse reactive surface, and a vent tube connecting said port with the exterior of the vehicle.

References Cited in the file of this patent

UNITED STATES PATENTS

| | | |
|---|---|---|
| 2,489,984 | Shoemaker | Nov. 29, 1949 |
| 2,552,181 | Kleinhans | May 8, 1951 |
| 2,736,522 | Wilson | Feb. 28, 1956 |
| 2,749,063 | Low | June 5, 1956 |
| 2,755,042 | Paddon | July 17, 1956 |